United States Patent [19]

Hein et al.

[11] Patent Number: 4,726,302

[45] Date of Patent: Feb. 23, 1988

[54] METHOD OF REDUCING THE NITROGEN OXIDE CONTENT OF A FLUE GAS PRODUCED BY A FOSSIL-FUEL POWER PLANT

[76] Inventors: Klaus Hein, Heppendorfer Str. 41, D-5010 Bergheim-Ahe; Joachim König, Rochusstr. 24, D-5010 Bergheim-Glessen, both of Fed. Rep. of Germany

[21] Appl. No.: 925,870

[22] Filed: Oct. 30, 1986

[30] Foreign Application Priority Data

Nov. 2, 1985 [DE] Fed. Rep. of Germany ....... 3539001

[51] Int. Cl.⁴ .......................... F23J 11/00; F23J 15/00
[52] U.S. Cl. .................................... 110/345; 110/215; 423/237
[58] Field of Search ................ 110/345, 215; 423/235, 423/237

[56] References Cited

U.S. PATENT DOCUMENTS

| 3,996,862 | 12/1976 | Besik et al. | 110/215 X |
| 4,051,225 | 9/1977 | Shiga et al. | 110/395 X |
| 4,335,084 | 6/1982 | Brogan | 110/345 X |
| 4,372,770 | 2/1983 | Krumwiede et al. | 110/345 X |
| 4,571,175 | 2/1986 | Bogle et al. | 110/238 X |

Primary Examiner—Edward G. Favors
Attorney, Agent, or Firm—Karl F. Ross; Herbert Dubno

[57] ABSTRACT

A method of reducing the nitrogen oxide level in flue gases from a fossil-fuel power plant in which $NH_3$ is admixed with the flue gas as a reducing agent and the nitrogen oxides are largely converted to molecular nitrogen by reducing them with the ammonia in a reactor. Residual ammonia forms $NH_3$ and $NH_4$ substances which deposit and from time to time are taken up in a wash water which is disposed of by introducing it in the boiler.

5 Claims, 1 Drawing Figure

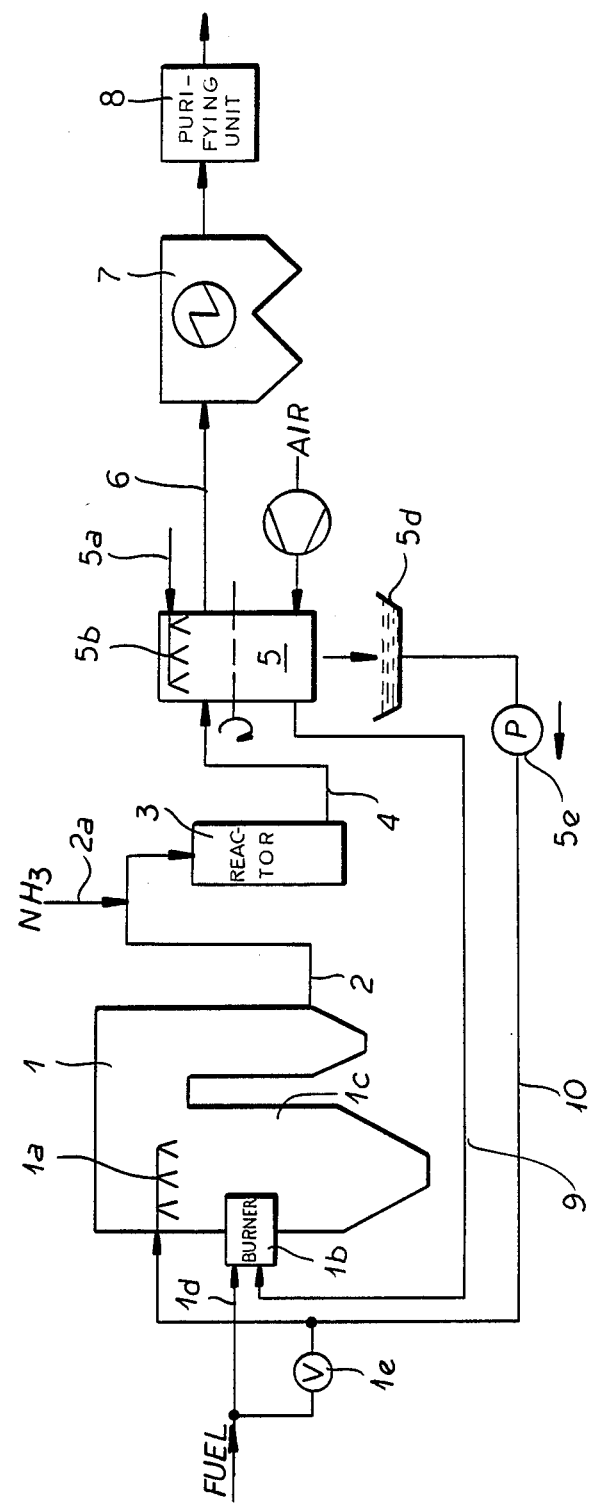

METHOD OF REDUCING THE NITROGEN OXIDE CONTENT OF A FLUE GAS PRODUCED BY A FOSSIL-FUEL POWER PLANT

FIELD OF THE INVENTION

Our present invention relates to a method of reducing the nitrogen oxide content of flue gas from an electricity-generating power plant boiler provided with a flue gas cleaning apparatus designed at least in part to reduce nitrogen oxide. More particularly, the invention relates to a method of this type in which ammonia is injected into the flue gas before the flue gas enters a reactor capable of effecting a reduction of the nitrogen oxides therein.

BACKGROUND OF THE INVENTION

In German open application DE-OS No. 29 28 526 there is described a method of reducing the nitrogen oxide content in the flue gas stream from the boiler of an electricity-generating fossil-fuel power plant wherein, upstream of a reactor capable of transforming the nitrogen oxides to molecular nitrogen as described more fully below, ammonia ($NH_3$) is added to serve as a reducing agent.

In the reactor, a selective catalytic reduction can be carried out or, if the reactor is maintained at a temperature of 800° to 1000° C., a noncatalytic reduction can be effected, whereby the nitrogen oxides are predominantly transformed to molecular nitrogen which is nontoxic.

During this reaction or subsequent thereto, residual ammonia in the gas stream may react with other components thereof to form precipitate compounds which are scrubbed so that a $NH_3$- or $NH_4$-containing waste water results.

In other domains in the operation of an electric-generating power plant of this type, $NH_3$- or $NH_4$-containing waste water may arise as well, e.g. in the wet scrubbing of fly ash or in the flue gas cleaning apparatus apart from the reducing reactor. Such apparatus is a normal part of modern power plant boiler technology for the removal of particulates and for the desulfurization of the stack gases before they are released into the atmosphere. A typical component of such waste waters is ammonium sulfide.

Disposal of the waste water has been a problem heretofore (see EPRI CS-3603, Project 1256-7, Final Report October 1984) since the waste water cannot be disposed of without treatment into open effluent systems. Indeed, the treatments required are comparatively expensive and time-consuming chemical and biological waste water treatments.

OBJECTS OF THE INVENTION

The principal object of this present invention is to provide a process for reducing the nitrogen oxide content of flue gases from a power plant boiler which eliminates the need for expensive biological and chemical treatment of the $NH_3$- and $NH_4$-containing waste water.

Another object of this invention is to provide an improved method of reducing the nitrogen oxide content of such flue gases which is highly simplified, more economical and even more energetically efficient than earlier systems.

SUMMARY OF THE INVENTION

We have discovered, surprisingly, that the $NH_3$- or $NH_4$-containing waste water need not be subjected to biological or chemical treatment and does not pose any problem whatsoever if it is introduced into the power plant boiler and there decomposed or reacted, e.g. to form nitrogen oxides which in any event will be substantially completely extracted from the flue gas stream at a subsequent stage in the process.

The invention thus utilizes the fact that the decomposition products of the ammonia or the ammonium-containing compounds of the waste water, in accordance with the invention, are entrained by the flue gas into the flue gas cleaning apparatus wherein in any event any such decomposition products which are toxic, are removed.

Advantageously, the waste water is sprayed directly into the fire box of the boiler.

Alternatively, or in addition, such waste water can be admixed with the fuel and subjected to combustion therewith.

Also alternatively or in addition, some or all of the waste water can be admixed with the combustion air stream which is used to burn the fuel in the fire box. The predominant nitrogenous compounds resulting from this thermal decomposition are, as noted, nitrogen oxides which are practically completely removed in the aforementioned reactor.

In yet another alternative, the waste water can be sprayed in finely divided form into flue gas in the boiler. The ammonia, if any, being driven off and contributing toward the reducing agent component when the flue gas reaches the reactor, while other nitrogen-containing compounds may react to produce predominantly nitrogen oxides.

Naturally other $NH_3$- or $NH_4$-containing waste water arising in the operation of the power plant can, of course, also be introduced in a similar manner into the boiler for decomposition therein.

The principal advantage of the present invention is that it eliminates completely any need for complex treatment of the $NH_3$- or $NH_4$-containing waste water which is produced in a fossil-fuel power plant.

The $NH_3$ is either driven off and successfully used as a reductant or the $NH_3$- or $NH_4$-containing substances are decomposed at elevated temperature and the resulting nitrogen oxides are eliminated in the usual flue gas cleaning apparatus without requiring additional augmentation thereof.

BRIEF DESCRIPTION OF THE DRAWING

The above and other objects, features and advantages of the present invention will become more readily apparent from the following description, reference being made to the sole FIGURE of which is a flow diagram of a system for carrying out the method of the invention.

SPECIFIC DESCRIPTION

In the diagram, the boiler 1 is shown to have a duct 2 from which the flue gas is led to a reactor 3, an injector 2a being provided to inject the $NH_3$ into the flue gas before it enters the reactor.

The flue gas leaving the reactor via line 4 is passed through an air preheater 5 and via a line 6 is supplied to an electrostatic filter 7 for the removal of particulate. Downstream of the electrostatic filter 7, a further flue gas purifying unit 8 of any conventional design can be provided, e.g. a wet desulfurization column, a dry desulfurization column, or a combination of wet and dry desulfurization columns followed, for example, by a further electrostatic filter and the stack from which the purified flue gas is discharged into the atmosphere.

Water is introduced at $5a$ to nozzles $5b$ of the preheater 5 to remove precipitated $NH_3$- or $NH_4$-containing substances which are deposited therein and are formed by residual ammonia from the reaction in the reactor 3.

The compressor $5c$ feeds the air to be preheated in unit 5 to the latter.

Because of the intermittent washing of the preheater 5, the $NH_3$- or $NH_4$-containing waste water is collected at $5d$ and is supplied by a pump $5e$ via a line 10 to the boiler 1 into which it is injected by the nozzles $1a$ into the flue gas.

Some of this waste water is, of course, entrained in the air delivered by the line 9 to the burner $1b$ of the fire box $1c$ of the boiler. The fuel for the burner is supplied at $1d$ thereto and a valve $1e$ can control the amount of the waste water which is admixed with the fuel before it enters the boiler.

The method is elucidated below in terms of numerical values and a complete example.

The ammonia is added as a reducing agent to the flue gas before it enters the reactor 3 which is preferably a catalyzed nitrogen oxide reducing reaction in which the nitrogen oxide reduction is effected principally in accordance with the following equations:

$4NH_3 + 4NO + O_2 \rightleftharpoons 4N_2 + 6H_2O$
$4NH_3 + 2NO_2 + O_2 \rightleftharpoons 3N_2 + 6H_2O$
$4NH_3 + 6NO \rightleftharpoons 5N_2 + 6H_2O$
$8NH_3 + 6NO_2 \rightleftharpoons 7N_2 + 12H_2O$ The reduction is incomplete so that a portion of the injection ammonia traverses the catalyst as so-called slip or unreacted ammonia and tends to react with other flue gas components, for example with sulfur trioxide. Ammonium compounds thereby result.

The degree of the $NH_3$ slip is determined by the specific catalyst volume, surface, geometry and composition and is also dependent upon the respective fuel and flue gas compositions, as well as upon the reaction temperature. Examples of $NH_3$ slip values after a SCR apparatus effecting a reduction of 80% in the $NO_2$ level is given in the following table:

| Molar Ratio $NH_3/NO_2$ (Ahead of Catalyst) | $NO_2$ Reduction Degree (%) | $NH_3$ Slip (mg/m$^3$) |
|---|---|---|
| 0.76 | 75 | 3 |
| 0.81 | 80 | 4 |
| 0.87 | 85 | 6 |
| 0.93 | 90 | 11 |
| 1.03 | 95 | 20 |

A disadvantageous side effect can be the reaction of the catalyst in reactor 3 of a portion of the sulfur dioxide in the flue gas in accordance with equation $2SO_2 + O_2 \rightleftharpoons 2SO_3$ This yields sulfur trioxide which reacts with an unreacted ammonia and water as follows:

$NH_3 + SO_3 + H_2O \rightleftharpoons NH_2HSO_2$
$2NH_3 + SO_3 + H_2O \rightleftharpoons (NH_4)_2SO_4$ The resulting ammonium salts, especially the ammonium hydrogen sulfate ($NH_4HSO_4$) condenses and desublimates at temperatures below 300° C. and can be entrained with fly ash to give a variety of problems such as decomposition and corrosion, namely in the air heater 5 disposed downstream of the reactor. The salts as a rule are readily water soluble and can be scrubbed off the surfaces with water or steam cleaning means.

Scrubbing is preferably carried out while the boiler is at standstill condition with approximately 3 to 5 m$^3$ of wash water per MW of electric power and the resulting waste water has the following composition (given only as to the important components):

| | |
|---|---|
| Solids content mg/l | 5000–10000 |
| Ammonium ($NH_4^+$), mg/l | 200–600 |
| Sulfate ($SO_4^{2-}$) mg/l | 10000–20000 |
| pH value | 1–5 |

The $NH_3$- and $NH_4$-containing waste water, in the specific example, is then sprayed into the flue gas of the boiler directly above the fire box and the resulting ammonia is oxidized in accordance, e.g. with the equations:

$4NH_3 + 3O_2 \rightleftharpoons 2N_2 + 6H_2O$
$4NH_3 + 5O_2 \rightleftharpoons 4NO + 6H_2O$
$4NH_3 + 4O_2 \rightleftharpoons 2N_2O + 6H_2O$ or by other routes of nitrogen oxide.

| Material Balance | 10$^6$ m$^3$/h |
|---|---|
| Flue gas volumetric flow: | |
| Waste water quantity from flushing of air heater 5: | 1200 m$^3$ |
| $NH_4^+$ content of waste water: | 400 mg/l |
| Waste water flow sprayed into flue gas: | 10 m$^3$/h |
| Duration of waste water flow: | 120 h |
| Mass flow of sprayed $NH_4^+$: | 4 kg/h |
| $NH_3$ quantity generated by evaporation: | 3.8 kg/h |
| NO quantity produced by complete oxidation of the $NH_3$ according to the reaction: $4 NH_3 + 5 O_2 \rightleftharpoons 4 NO + 6 H_2O$: | 6.7 kg/h |
| Increase in NO concentration in flue gas, calculated as $NO_2$ | 10.2 mg/m$^3$ |

The latter increase in $NO_2$ concentration has no effect on the removal of nitrogen oxides in the reactor 3 and the nitrogen oxides are readily eliminated.

We claim:

1. A method of reducing the nitrogen oxide content in a flue gas stream which is produced by a fossil-fuel electricity-generating power plant boiler provided with a flue-gas cleaning apparatus, comprising the steps of:

(a) adding $NH_3$ to a flue gas produced by a fossil-fuel electricity-generating power plant boiler upstream from a reactor of said apparatus into which the flue gas passes admixed with said $NH_3$;

(b) causing the $NH_3$ to react with nitrogen oxides of said flue gas, thereby transforming said nitrogen oxides in said reactor at least predominantly to nitrogen and forming ammonium-compound reaction products at least in part in said reactor;

(c) thereafter scrubbing said ammonium-compound reaction products from said flue gas to form a waste water containing $NH_3$- or $NH_4$-containing substances; and (d) injecting said waste water into a firebox of said boiler directly upon formation in step (c) for thermal decomposition of the $NH_3$- or $NH_4$-containing substances therein and formation of a flue gas which is further processed in accordance with steps (a) to (c).

2. The method as defined in claim 1 wherein said waste water is admixed with a fossil fuel, said method further comprising the step of firing the boiler with said fossil fuel with which said waste water has been admixed.

3. The method defined in claim 1 wherein said waste water is admixed with a combustion air stream, said method further comprising the step of firing the boiler with a fossil fuel by burning it with said combustion air stream with which said waste water has been admixed.

4. The method defined in claim 1 wherein said waste water is dispersed in finely divided form in said flue gas in said boiler.

5. The method defined in claim 1 wherein other $NH_3$- and $NH_4$-containing waste water is produced in the operation of the power plant of said boiler and said other $NH_3$- and $NH_4$-containing waste water is also introduced into said boiler for decomposition of the $NH_3$ and $NH_4^+$ thereof.

* * * * *